(12) United States Patent
Adamski (10) Patent No.: US 7,166,821 B2
(45) Date of Patent: Jan. 23, 2007

(54) RADIANT CONVECTION WARMING DRAWER

(76) Inventor: Joseph R. Adamski, 1420 Rutherford Dr., Pasadena, CA (US) 91103-2772

( * ) Notice: Subject to any disclaimer, the term of this patent is extended or adjusted under 35 U.S.C. 154(b) by 0 days.

(21) Appl. No.: 11/076,149

(22) Filed: Mar. 9, 2005

(65) Prior Publication Data

US 2005/0211696 A1 Sep. 29, 2005

Related U.S. Application Data

(60) Provisional application No. 60/556,574, filed on Mar. 29, 2004.

(51) Int. Cl.
*A47J 36/24* (2006.01)
*F27D 7/04* (2006.01)

(52) U.S. Cl. ............. 219/400; 219/411; 126/21 A (58) Field of Classification Search ......... 219/385–86, 219/392, 374, 400; 99/483; 126/21 A, 339; 312/330.1, 334.16, 334.22
See application file for complete search history.

(56) References Cited

U.S. PATENT DOCUMENTS

| 5,771,789 | A | * | 6/1998 | Davis ........................ 99/468 |
| 5,904,412 | A | * | 5/1999 | Lammens ................ 312/334.7 |
| 5,948,301 | A | * | 9/1999 | Liebermann ................ 219/395 |
| 6,098,529 | A | * | 8/2000 | Brummett et al. ............ 99/467 |
| 6,124,572 | A | * | 9/2000 | Spilger et al. ............... 219/400 |
| 6,484,512 | B1 | * | 11/2002 | Anderson et al. ............. 62/3.2 |
| 6,849,835 | B1 | * | 2/2005 | Bollmers et al. ........... 219/520 |
| 6,917,016 | B1 | * | 7/2005 | Backer et al. .............. 219/385 |
| 2005/0274712 | A1 | * | 12/2005 | Gagas et al. ................ 219/385 |

* cited by examiner

*Primary Examiner*—Joseph Pelham
(74) *Attorney, Agent, or Firm*—Schiff Hardin LLP (57) ABSTRACT

A warming drawer has a cabinet defining a cavity and a tray that slides into and out of the cavity. An infrared heating lamp is positioned within the cabinet to heat the cavity, and a fan is supported by the cabinet and is configured to circulate air from the cavity to the infrared heating lamp and back into the cavity. A controller is supported by the cabinet and controls the infrared heating lamp and the fan.

29 Claims, 8 Drawing Sheets

RADIANT CONVECTION WARMING DRAWER

This application claims the benefit of U.S. Provisional Application No. 60/556,574 Filed Mar. 29, 2004

TECHNICAL FIELD OF THE INVENTION

The present invention relates to warming drawers that are used to warm foods.

BACKGROUND OF THE INVENTION

Modern day warming drawers typically use low power, low cost "calrod" sheathed tubular heating elements to warm the drawer cavity, inexpensive glass or ceramic wool insulation to reduce heat flow out of the drawer cabinet, and low cost gas-bulb expansion thermostats to regulate drawer cavity temperature. Often, the electrical power of the "calrods" is set to just balance the losses of the warming drawer at maximum requested temperature, thereby allowing operation at a safe temperature in the event the drawer thermostat fails in an electrically conductive mode.

Because of the high thermal lag of the "calrod", because of the characteristic low cost and low performance of typical insulations, and because of the need to keep design element and electronic control component count down, current technology warming drawers fail to meet consumer expectations in a number of respects.

For example, current technology warming drawers require a 20 minute time period for preheating to user selected temperature and, thus, the consumer must wait. Also, when an article is placed into a current technology warming drawer, the drawer temperature is momentarily changed to kitchen temperature and the thermal mass of the typical calrod causes very slow recovery. Thus, the warming drawer is slow to recover from drawer loading and unloading temperature changes.

Moreover, due to the use of low cost insulation, standby energy loss of typical warming drawers has been measured to be as high as 50%. Such a standby energy loss is very high. Additionally, because the calrod systems of current technology warming drawers are typically low power and low temperature radiant, free convection systems, stacks of dinner plates, cups and saucers, or other thick items are heated only unidirectionally. Thus, these warming drawers have low drawer temperature uniformity such that heat transfer to the entire volume of the article being heated is limited.

Finally, drawer slide systems typically used in current technology warming drawers are of poor quality. At full extension of the drawer slide systems, the drawers "wobble" from side to side, which detracts from the stability, safety, usefulness, and user perception of quality of the warming drawers.

SUMMARY OF THE INVENTION

According to one aspect of the present invention, a warming drawer comprises a cabinet, a tray slidable into and out of a cavity of the cabinet, an infrared heating lamp that heats the cavity, a fan that circulates air from the cavity to the infrared heating lamp and back into the cavity, and a controller that controls the infrared heating lamp and the fan.

According to another aspect of the present invention, a method of controlling the temperature of warming drawer is provided. The warming drawer comprises a cabinet, a tray that slides into and out of a cavity of the cabinet, an infrared heating lamp that heats the cavity, and a fan that circulates air from the cavity to the infrared heating lamp and back into the cavity. The method comprises the following: accepting a user defined set point temperature; accepting a user instruction to begin warming; and, energizing the infrared heating lamp and the fan in response to the user instruction to begin warming.

BRIEF DESCRIPTION OF THE DRAWINGS

These and other features and advantages of the present invention will become more apparent from a detailed consideration of an embodiment of the invention when taken in conjunction with the drawings in which.

DETAILED DESCRIPTION

Figure 1:
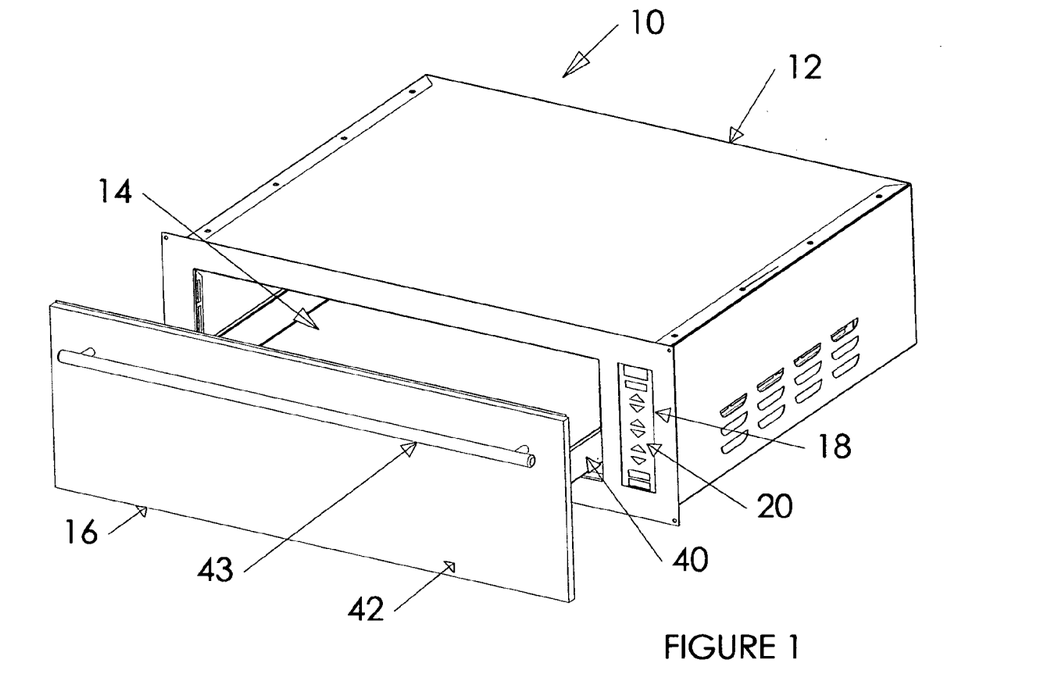
FIG. 1 is a perspective view of a warming drawer according to an embodiment of the present invention.

A warming drawer 10, as shown in FIG. 1, includes a cabinet 12 defining a drawer cavity 14 accessible by a drawer 16. The cabinet 12 has a recess 18 that receives an input keypad 20 shown in more detail in FIG. 2. As explained more fully below, the warming drawer 10 includes infrared energy sources, infrared energy source cooling fans, improved high performance insulation, and a low side-wall drawer with improved slide configuration. The drawer cavity 14 of the warming drawer 10 can be rapidly heated (e.g., from room temperature to 140° F. in 5 minutes, and from room temperature to 190° F. in 10 minutes), it can quickly recover from drawer loading and unloading temperature changes, it has low standby loss (e.g., 10 w, which is about 10% of the input energy), it provides a highly uniform cavity temperature (e.g., ±2° F.), and it has improved drawer stability and accessibility.

The warming drawer 10 combines one or more of the following features: electronic control, infrared energy sources, forced convection cooling/heat distribution fans, insulation boards, and a low side wall drawer.

Figure 3:
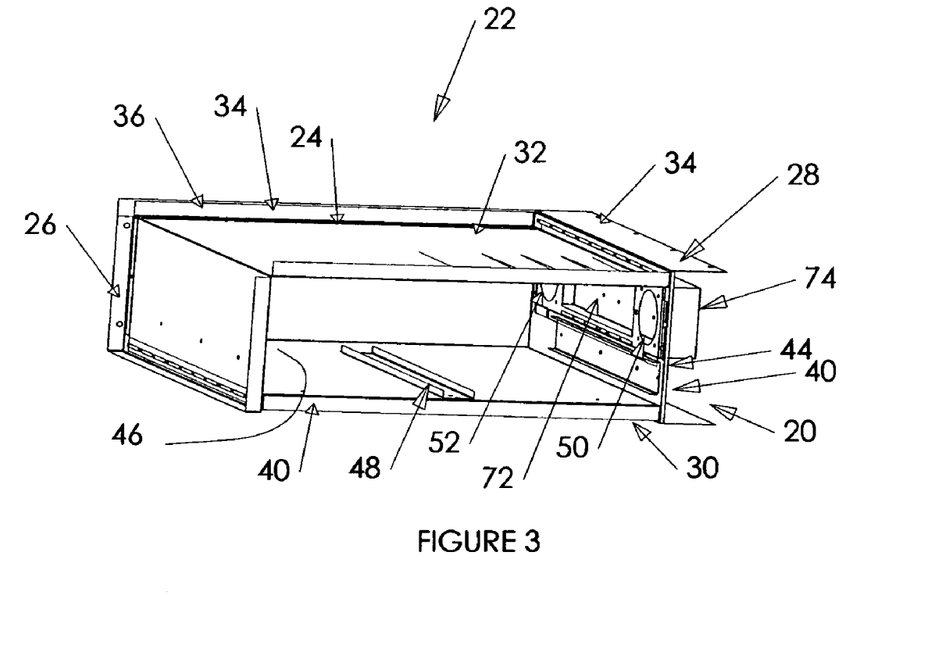
FIG. 3 illustrates a frame of the warming drawer shown in FIG. 1.

The warming drawer 10 has a frame 22 that is housed within the cabinet 12. The frame 22, as shown in FIG. 3, has a top pan 24, a side pan 26, a side panel 28, and a bottom pan 30 that are suitably attached together to define the drawer cavity 14. The top pan 24 has a floor 32 and four side walls 34 that extend up from the floor 32 to define a recess 36 that is configured to receive an insulating board. Similarly, the side pan 26 and the bottom pan 30 have recesses defined by side walls and a floor that receive corresponding insulating boards.

A low cost polystyrene or polyisocyanourethane foam insulation panel and a vacuum insulating panel are sandwiched together as the insulation board to achieve low heat transfer. The proportions of the insulation board are determined in accordance with inside and outside temperatures of the drawer, thermal limit of the vacuum insulating panel, and thermal conductivities of the vacuum insulating panel and the foam insulation panel. For example, a 0.5 inch thick foam insulation panel and a 0.5 inch thick vacuum insulating panel may be sandwiched together to form a 1.0 inch thick insulation board. A further benefit of the foam insulation panel sandwiched with the vacuum insulating panel is that the foam insulation effectively reduces heat flow through the sandwich, and so, reduces the surface temperature of the vacuum insulating panel to a satisfactory level (e.g., below 170° F.) for long term operation of the vacuum insulating panel.

Additional insulation boards can be mounted so as to fill a rear pan of the frame 12 and to fill the side panel 28. Accordingly, except for the drawer 16 and heater assembly side, the drawer cavity 14 is enclosed by the insulation board.

The drawer 16 has a tray 40 attached to a front panel 42. A handle 43 may be suitably attached to the front panel 42 to permit the user to pull out the drawer 16 from the cabinet 12 and to push the drawer 16 back into the cabinet 12.

The tray 40 is supported to the frame 22 by a three slide system. This system includes a first low profile extension slide 44 mounted between the tray 40 and the side panel 28, a second low profile extension slide 46 mounted between the tray 40 and the side pan 26, and a third low profile extension slide 48 mounted between the tray 40 and the bottom pan 30 of the frame 22. All three slides may have the same construction.

Typical warming drawers use two full extension slides on the left and right side of the drawer and, therefore, are unstable in the full "out" or extended position. This lack of stability results from the slide being stiff in the vertical plane but not in the horizontal plane of the drawer. The use of the third extension slide 48 below the center of the tray 40 in a left-right or horizontal stiff position allows low profile slides to be used on the sides of the tray 40, allows improved radiative and conductive heat transfer from the lamp/fan arrangement located at the side of the warming drawer 10, improves the load carrying capacity of the warming drawer 10, and effectively eliminates the drawer side-to-side (left-right) motion.

Figure 4:
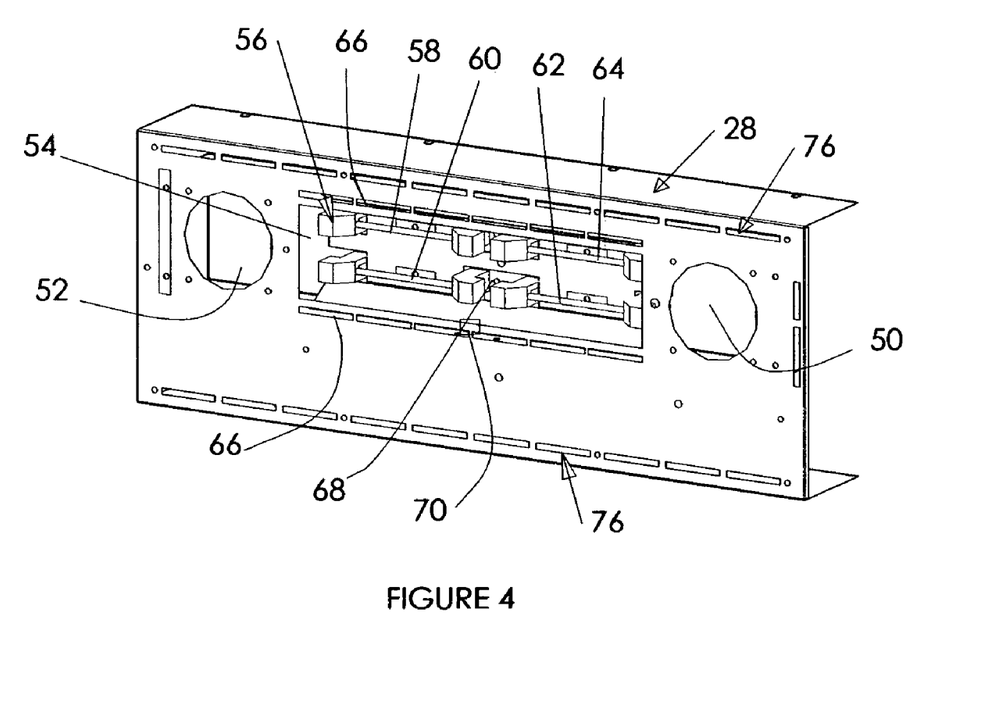
FIG. 4 illustrates a side panel of the warming drawer shown in FIG. 1.

The side panel 28, as shown in greater detail in FIG. 4, has fan openings 50 and 52 and a heating lamp opening 54. The side panel 28 supports a heating lamp mounting bracket 56 that forms a lamp socket area to mount four heating lamps 58, 60, 62, and 64 at the heating light opening 54 so that heating produced by the heating lamps 58, 60, 62, and 64 can enter the drawer cavity 14 in order to warm articles supported by the tray 40. The use of more that one heating lamp permits redundant operation in case of lamp failure. Fewer or more heating lamps can be used. The heating lamps 58, 60, 62, and 64 may be low mass infrared heaters such as tungsten filament halogen infrared lamps that may be operated at 600 watts.

A plurality of air intake slots 66 are provided through the side panel 28 above and below the heating lamp opening 54. Also, the heating lamp mounting bracket 56 has a hole 68 therethrough to permit a temperature sensor 70 to be mounted in the center of the lamp housing and to protrude sufficiently to receive convective air flow representative of the drawer cavity temperature.

Readily available (off the shelf) halogen lamps may be used for the heating lamps 58, 60, 62, and 64. These lamps are infrared energy sources and operate at sufficiently high temperatures to emit a large portion of their output spectrum in the infrared energy band of the electromagnetic spectrum. As items placed in the warming drawer 10 have already been cooked, these heating lamps can be controlled to create a biologically safe environment (greater than 140° F.) but to minimize the potential for any substantial further cooking (less than 190° F.)

The heating lamp mounting bracket 56 may be reflective to direct as much energy as possible out of the lamp socket area and into the drawer cavity 14. A high infrared energy transmission shield 72 may be provided as a cover over the lamp socket area in order to protect the user from touching the hot lamp surface, and gives the drawer an appealing red glow when in operation. Ceran™ or Robax™ glass from Schott Glass Corporation may be used for the high infrared energy transmission shield 72.

Also, fans 74 may be mounted at each of the fan openings 50 and 52. One such fan can be seen in FIG. 3. The heating lamps 58, 60, 62, and 64 are high temperature, infrared sources that typically emit a substantial amount of radiation. The fans 74, the heating lamp mounting bracket 56, the temperature sensor mounted in the hole 68, the high infrared energy transmission shield 72, and the frame 22 in the immediate vicinity of the heating lamps 58, 60, 62, and 64 get hot. These areas typically have an emissivity of 0.3–0.6 so that they absorb energy and heat up. The heating lamps 58, 60, 62, and 64 get hot as well. The fans 74, however, provide forced air circulation to draw cooler air from the drawer cavity 14 in through the air intake slots 66 so as to cool the heating lamps 58, 60, 62, and 64 as well as the fans 74, the heating lamp mounting bracket 56, the temperature sensor 70 mounted in the hole 68, the high infrared energy transmission shield 72, and the frame 22 in the immediate vicinity of the heating lamps 58, 60, 62, and 64, and to force this air back into the drawer cavity 14 at a higher temperature. During this forced convection heat transfer process, the temperature sensor 70 detects the temperature of the drawn in air, and sends a signal to a microcontroller 80 (FIG. 5) to adjust the duty cycle of the heating lamps 58, 60, 62, and 64 to a level sufficient to regulate the temperature in the drawer cavity 14 to the set point temperature selected by the user.

Figure 5:
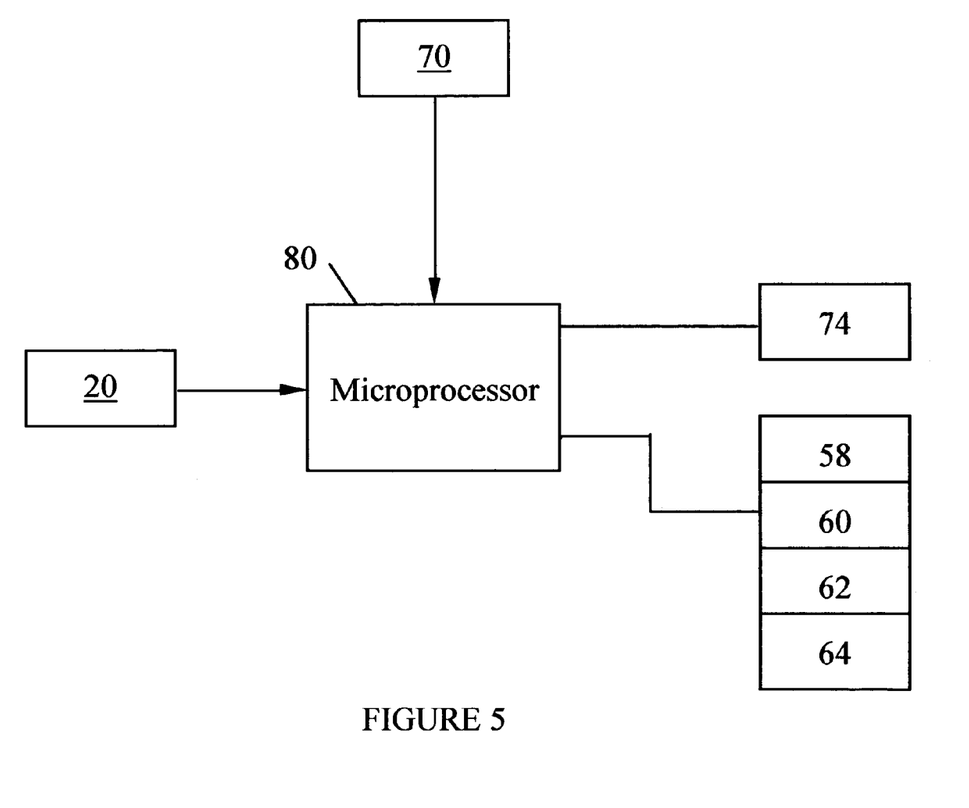
FIG. 5 illustrates circuitry that may be used to control the warming drawer of FIG. 1; and, FIGS. 6A–6F illustrate event initiated software executed by the circuitry of FIG. 5 so as to control of the warming drawer of FIG. 1.

The microcontroller 80 processes user inputs and regulates the temperature within the drawer cavity 14 of the warming drawer 10. In order to warm articles in the warming drawer 10, the user pulls out the drawer 16, places the articles to be warmed in the tray 40 of the drawer 16, pushes the drawer 16 back in. The user then programs the microcontroller 80 to activate and regulate the heating system.

Figure 2:
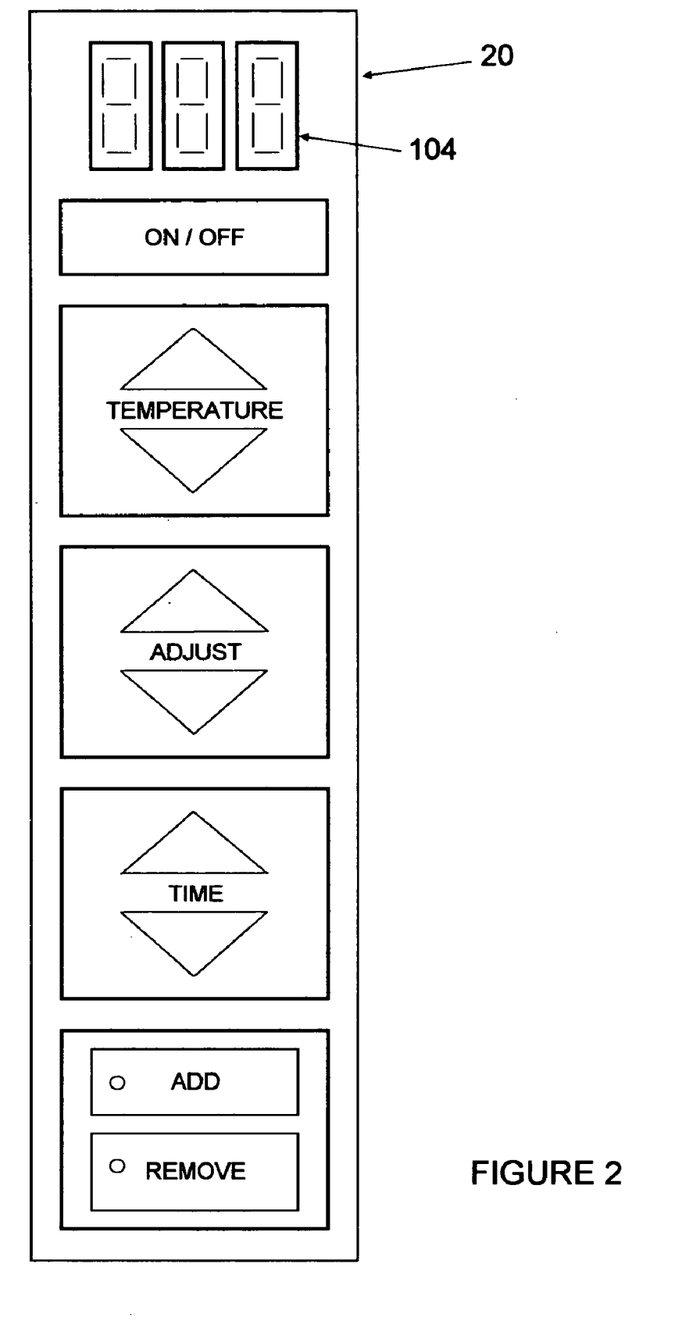
FIG. 2 illustrates an input keypad of the warming drawing shown in FIG. 1.

This programming is accomplished by first specifying the desired drawer temperature and the "on" time of the unit using the input keypad 20 shown in FIG. 2. The act of depressing keys on the input keypad 20 transmits signals to the microcontroller 80 that a specific temperature and warming "on" time have been requested. By pressing the ON/OFF key on the input keypad 20, the user instructs the microcontroller 80 to start or terminate the warming process.

In one embodiment, the microcontroller 80 retains in memory a list of temperatures and "on" times which the user can access. TEMPERATURE UP and TEMPERATURE DOWN keys scroll through the list of temperatures stored in memory. ADJUST keys allow the user to increase or decrease the displayed temperature value in 5° F. increments until the value is satisfactory. ADD and REMOVE keys allow the user to add the displayed value to the list of temperatures stored in memory or to remove the displayed value from this list.

A similar user input approach is provided for "on" times. The TIME UP and TIME DOWN keys scroll through the list of times stored in memory. The ADJUST keys allow the user to increase or decrease the on time in 5 minute increments until the value is satisfactory. The ADD and REMOVE keys allow the user to add the displayed value to the list of times stored in memory or to remove the displayed value from this list.

When the ON/OFF key is pressed, the fans 74 are turned on and the microcontroller 80 executes software code configured to read a temperature signal from the temperature sensor 70 representative of the drawer temperature, to determine if the heating lamps 58, 60, 62, and 64 should be energized or not for the requested time period, and to regulate the temperature of the warming drawer 10 and its contents. The heating lamps 58, 60, 62, and 64 may be modulated full on or full off to maintain temperature of the warming drawer 10. Alternatively, the heating lamps 58, 60, 62, and 64 may be phase modulated similar to a lamp dimmer used in homes today in order to accurately maintain the temperature of the warming drawer 10.

Figure 6A:
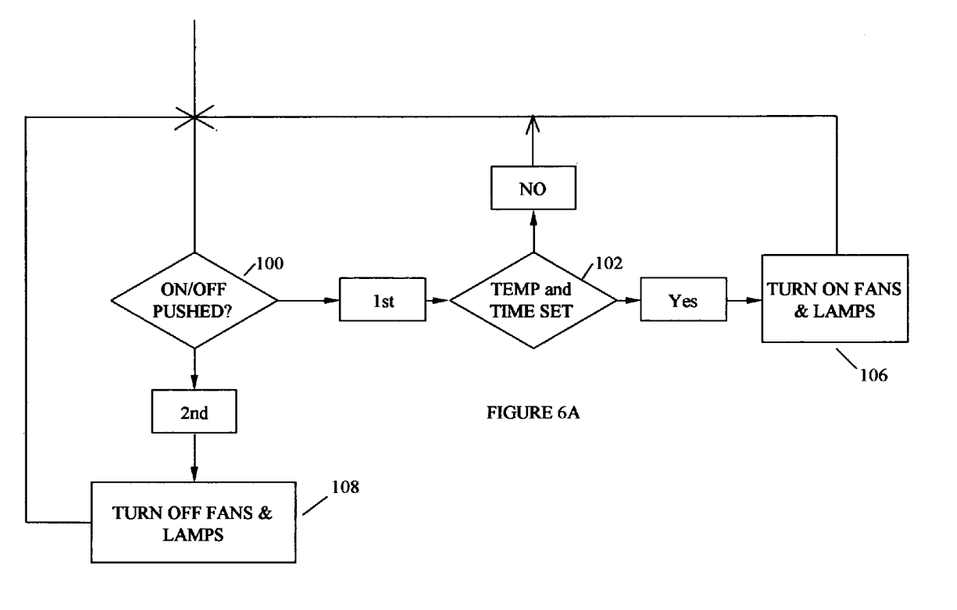

FIGS. 6A–6F illustrate event initiated software executed by the circuitry of FIG. 5 so as to control of the warming drawer 10. As shown in FIG. 6A, when a user presses the ON/OFF key a first time at block 100, a test is made at a block 102 to determine if a temperature and a time have been set by the user. This temperature and time are sequentially displayed in a display window 104 of the input keypad 20 as the user inputs temperature and time. If a temperature and a time have been set by the user, the fans 74 and the heating lamps 58, 60, 62, and 64 are turned on and are controlled at a block 106 to maintain the warming drawer 10 at the temperature and for the time set by the user.

In one embodiment, the heating lamps 58, 60, 62, and 64 are modulated at a power level generally proportional to how far the temperature in the drawer cavity 14 is away from the set point, i.e., the temperature programmed by the user. Full power may be applied to the heating lamps 58, 60, 62, and 64 until the actual temperature within the drawer cavity 14 is at a first temperature, where the first temperature is below the set point by a predetermined number of degrees. The first temperature, for example, may be about 10° F. below the set point temperature. The duty cycle of the heating lamps 58, 60, 62, and 64 is then slowly reduced until the temperature within the drawer cavity 14 is at a second temperature, where the second temperature is just above the set point by a predetermined number of degrees. The second temperature, for example, may be about 2° F. above the set point temperature. At that point, power to the heating lamps 58, 60, 62, and 64 is shut off. When the drawer cavity 14 cools to a third temperature, where the third temperature is below the set point by a predetermined number of degrees, the heating lamps 58, 60, 62, and 64 are started up again from 0 duty cycle. The third temperature, for example, may be about 1° F. below the set point temperature. The fans 74 and the heating lamps 58, 60, 62, and 64 run for the amount of time set by the user.

On the other hand, if a temperature and a time have not been set by the user as determined at the block 104, the warming drawer 10 does not start up, indicating to the user that a temperature and/or a time have not been entered. When a user presses the ON/OFF key a second time at block 100, the fans 74 and the heating lamps 58, 60, 62, and 64 are turned off at a block 108. Thus, the user can override the previously entered programming.

Figure 6B:
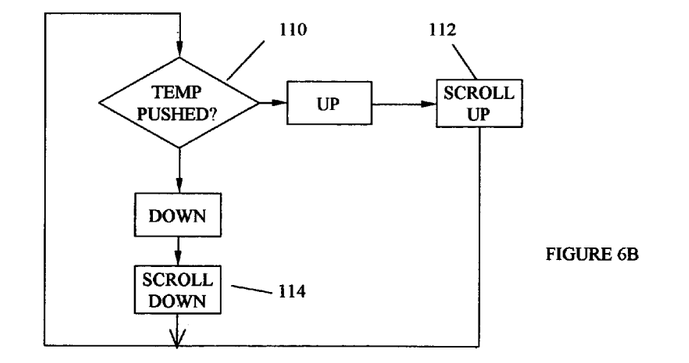

As shown in FIG. 6B, when a user presses the TEMPERATURE UP key at a block 110, temperature is scrolled up one stored temperature setting at a block 112. On the other hand, when a user presses the TEMPERATURE DOWN key at the block 110, temperature is scrolled down one stored temperature setting at a block 114.

Figure 6C:
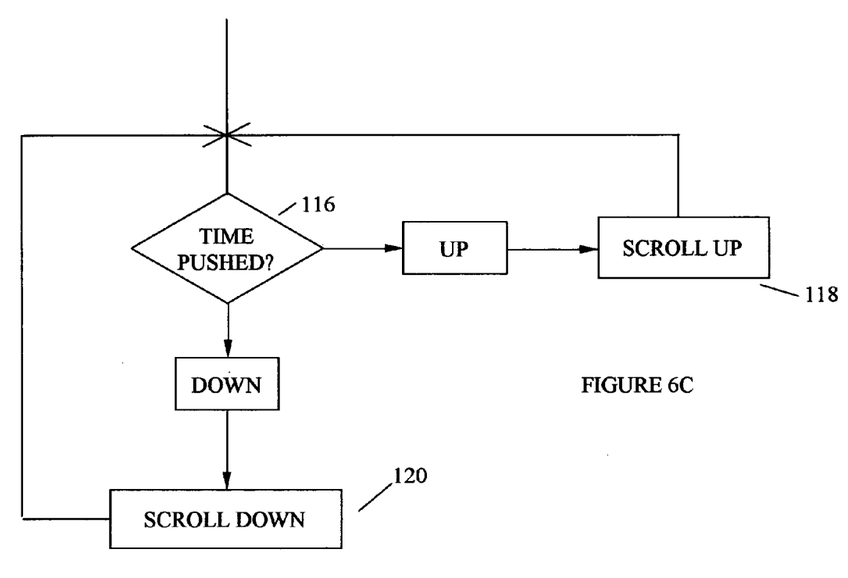

As shown in FIG. 6C, when a user presses the TIME UP key at a block 116, time is scrolled up one stored time setting at a block 118. On the other hand, when a user presses the TIME DOWN key at the block 116, time is scrolled down one stored time setting at a block 120.

Figure 6D:
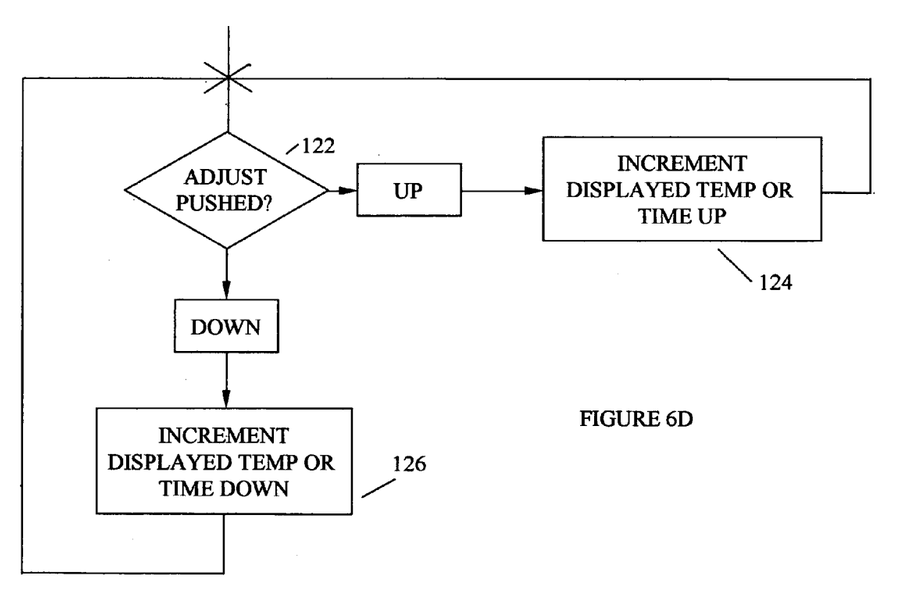

As shown in FIG. 6D, when a user presses the ADJUST UP key at a block 122, the displayed temperature or time is adjusted upward one increment at a block 124. On the other hand, when a user presses the ADJUST DOWN key at the block 122, the displayed temperature or time is adjusted downward one increment at a block 126.

Figure 6E:
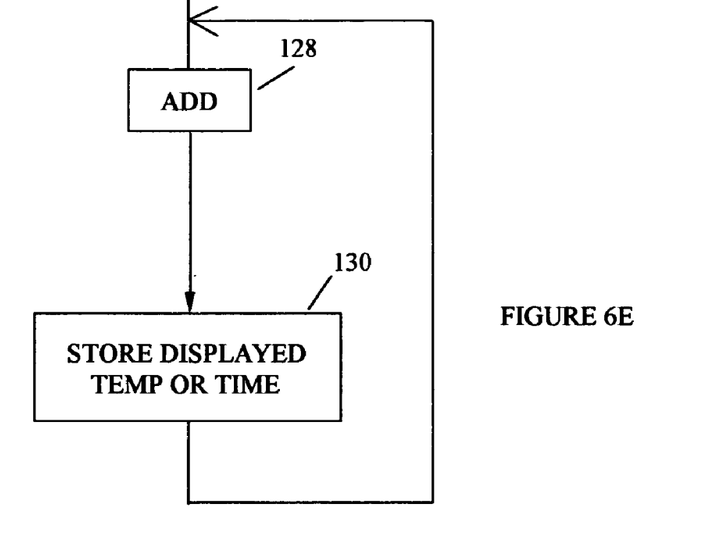

As shown in FIG. 6E, when a user presses the ADD key at a block 128, the displayed temperature or time is stored in memory by the microcontroller 80 at a block 130.

Figure 6F:
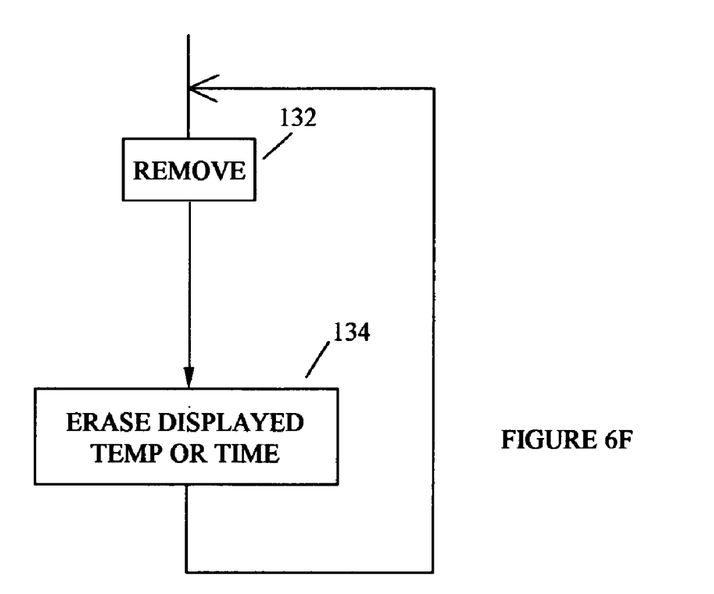

As shown in FIG. 6F, when a user presses the REMOVE key at a block 132, the displayed temperature or time is erased from memory by the microcontroller 80 at a block 134.

In one embodiment, to allow economy of manufacture and to provide a good quality radiation field as well as air circulation pattern, the microcontroller 80, the power supply for the fans 74 and the heating lamps 58, 60, 62, and 64, the fans 74, and the temperature sensor 70 are assembled into a single housing and affixed to the side panel 28. This housing may be mounted under the input keypad 20.

Moreover, the side of the tray 40 facing the heating lamps 58, 60, 62, and 64 may be configured with a low profile so as to allow direct infrared radiation from the heating lamps 58, 60, 62, and 64 to the drawer cavity 14 as well as to permit forced convection air to flow directly to the articles placed in the tray 40 of the drawer 16.

Because the warming drawer 10 operates at a temperature range of about 80° F. to about 190° F., standard insulation used in typical cooking appliances may be inappropriate. The insulating value of typical glass or ceramic insulation is a result of the fiber cost and density required for reducing heat flow when used in typical 350° F. to 1000° F. ovens. The warming drawer 10 takes advantage of two insulating embodiments to effectively reduce heat transfer, thereby minimizing operating cost of the unit and heat leaked into the kitchen environment. The insulation board disclosed above, composed of a sandwich of insulating foam and vacuum insulating panel, eliminates any convective air heat transfer present in fiberglass insulations and avoids the high costs and misapplication of the high temperature ceramic insulations.

Alternatively, insulating foam may be used as the complete insulating board. While this embodiment results in reduced insulating value, it is considerably less expensive than the composite board constructed from insulating foam and vacuum insulating panel, and still an improved insulator when compared to standard fiberglass or ceramic insulations.

To simplify manufacture of this invention, the frame 22 is formed as separate, rectangular, and flanged surfaces as shown in FIG. 3. The top pan 24, the side pan 26, the side panel 28, and the bottom pan 30 may be fastened together with machine screws, pop rivets, or welding. In the event that a different warming drawer width is required to match kitchen cabinetry or household food preparation rates, the width of the tray 40 and the sizes of the top pan 24 and the bottom pan 30 are changed to the required size. The side pan 26 and the side panel 28 are unchanged regardless of tray width and so, may be manufactured separately in high volume and attached to the warming drawer on the assembly line in response to sales requirements.

The warming drawer 10 may be used in outdoor applications. It may also be used in integrated applications—where the radiant convection warming drawer may be built into free-standing ranges or wall ovens. It may also be used in military food service settings where a large number of persons may be dining on food that is prepared ahead of time and kept warm until serving time to accelerate delivery. The warming drawer 10 may also be used in portable applications such as automotive, truck, airline, etc., where speed and uniformity of heating (but not further cooking) are important.

Thermal brakes (slots) 76 are formed in each of the heat loaded walls of the cavity to minimize conductive heat transfer out the appliance and so, improve energy efficiency.

Certain modifications of the present invention have been discussed above. Other modifications will occur to those practicing in the art of the present invention. For example, as described above, the side of the tray 40 facing the heating lamps 58, 60, 62, and 64 is low so as to allow direct infrared radiation from the heating lamps 58, 60, 62, and 64 to the drawer cavity 14 as well as to allow forced convection air flow to directly reach the articles placed in the tray 40. Instead, the sides of the tray 40 may be high to permit the tray to hold stacked items stably. In this case, however, the side of the tray 40 facing the heating lamps 58, 60, 62, and 64 and the fans 74 should have one or more openings so as to allow direct infrared radiation from the heating lamps 58, 60, 62, and 64 to the drawer cavity 14 as well as to allow forced convection air flow to directly reach the articles placed in the tray 40.

Moreover, although the warming drawer 10 is shown above with a single tray, the warming drawer 10 can be provided with more than one tray and, indeed, with more than one drawer.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A warming drawer comprising:
    a cabinet;
    a tray slidable into and out of a cavity of the cabinet;
    an infrared heating lamp positioned within the cabinet to heat the cavity;
    a fan supported by the cabinet and configured to circulate air from the cavity to the infrared heating lamp and back into the cavity; and,
    a controller supported by the cabinet and arranged to control the infrared heating lamp and the fan.

2. The warming drawer of claim 1 wherein the cabinet comprises a reflective mounting bracket that mounts the infrared heating lamp to a side of the cavity.

3. The warming drawer of claim 2 wherein the tray has a side, wherein the side faces the reflective mounting bracket, and wherein the side is configured to permit direct infrared radiation from the infrared heating lamp to the cavity and to permit convection air to flow directly from the fan to the cavity.

4. The warming drawer of claim 1 wherein the cabinet includes a three slide system that permits the tray to slide into and out of the cavity.

5. The warming drawer of claim 4 wherein the three slide system comprises:
    a first slide between the cabinet and a side of the tray facing the infrared heating lamp;
    a second slide between the cabinet and a side of the tray opposite to the side of the tray facing the infrared heating lamp; and,
    a third slide between the tray and a floor of the cabinet.

6. The warming drawer of claim 4 wherein the cabinet comprises a reflective mounting bracket that mounts the infrared heating lamp to a side of the cavity.

7. The warming drawer of claim 6 wherein the tray has a side, wherein the side faces the reflective mounting bracket, and wherein the side is configured to permit direct infrared radiation from the infrared heating lamp to the cavity and to permit convection air to flow directly from the fan to the cavity.

8. The warming drawer of claim 7 wherein the three slide system comprises:
    a first slide between the cabinet and a side of the tray facing the infrared heating lamp;
    a second slide between the cabinet and a side of the tray opposite to the side of the tray facing the infrared heating lamp; and,
    a third slide between the tray and a floor of the cabinet.

9. The warming drawer of claim 1 further comprising at least one additional infrared heating lamp and at least one additional fan supported by the cabinet.

10. The warming drawer of claim 1 wherein the controller comprises a thermostat disposed to sense a temperature of the cavity.

11. The warming drawer of claim 1 wherein the cabinet comprises a top pan, a side pan, a bottom pan, and a side panel, wherein the top pan, the side pan, the bottom pan define corresponding recesses, wherein the cabinet further comprises corresponding insulation boards fitted into the recesses of the top pan, the side pan, the bottom pan, and wherein the infrared heating lamp, the fan, and the controller are mounted to the side panel.

12. The warming drawer of claim 11 wherein the each of the insulation boards comprises a foam insulation panel and a vacuum insulating panel.

13. A method of controlling the temperature of a warming drawer, the warming drawer comprising a cabinet, a tray slidable into and out of a cavity of the cabinet, an infrared heating lamp positioned within the cabinet to heat the cavity, and a fan supported by the cabinet and configured to circulate air from the cavity to the infrared heating lamp and back into the cavity, the method comprising:
    accepting a user defined set point temperature;
    accepting a user instruction to begin warming; and,
    energizing the infrared heating lamp and the fan in response to the user instruction to begin warming.

14. The method of claim 13 wherein the energizing of the infrared heating lamp and the fan in response to the user instruction to begin warming comprises duty cycling power to the infrared heating lamp.

15. The method of claim 13 wherein the energizing of the infrared heating lamp and the fan in response to the user instruction to begin warming comprises:
    applying full power to the infrared heating lamp until the temperature within the cavity reaches a first temperature;
    duty cycling power to the infrared heating lamp until the temperature within the cavity reaches a second temperature;
    shutting off power to the infrared heating lamp when the temperature within the cavity reaches the second temperature.

16. The method of claim 15 wherein the first temperature is below the set point temperature, and wherein the second temperature is above the set point temperature.

17. The method of claim 16 wherein the first temperature is about 10° F. below the set point temperature, and wherein the second temperature is about 2° F. above the set point temperature.

18. The method of claim 15 wherein the duty cycling of power to the infrared heating lamp comprises reducing the duty cycle as the temperature within the cavity approaches the second temperature.

19. The method of claim 15 further comprising duty cycling power to the infrared heating lamp from a zero duty cycle when the cavity cools to a third temperature.

20. The method of claim 19 wherein the first temperature is below the set point temperature, wherein the second temperature is above the set point temperature, and wherein the third temperature is between the first temperature and the set point temperature.

21. The method of claim 20 wherein the first temperature is about 10° F. below the set point temperature, wherein the second temperature is about 2° F. above the set point temperature, and wherein the third temperature is about 1° F. below the set point temperature.

22. The method of claim 19 wherein the duty cycling of power to the infrared heating lamp comprises reducing the duty cycle as the temperature within the cavity approaches the second temperature.

23. The method of claim 13 further comprising accepting a user defined amount of time for warming the cavity.

24. The method of claim 13 wherein the accepting of a user defined set point temperature comprises accepting the user defined set point temperature from a control panel operated by the user, wherein the accepting of a user instruction to begin warming comprises accepting the user instruction to begin warming from the control panel operated by the user, and wherein the control panel is supported by the cabinet.

25. A warming drawer comprising:
   a cabinet having a front side and a cavity behind the front side;
   a tray slidable into and out of a cavity through the front side of the cabinet;
   an infrared heating lamp positioned within the cabinet to heat the cavity;
   a fan supported by the cabinet and configured to circulate air from the cavity to the infrared heating lamp and back into the cavity;
   a controller supported by the cabinet and arranged to control the infrared heating lamp and the fan; and,
   an input control panel on the front side of the cabinet, wherein the input control panel includes at least a temperature setting input and an on/off input, and wherein the input control panel permits a user to enter at least temperature setting and on/off information into the controller.

26. The warming drawer of claim 25 wherein the input control panel comprises an input keypad having at least temperature setting and on/off keys.

27. The warming drawer of claim 26 wherein the input keypad includes a time setting key.

28. The warming drawer of claim 25 wherein the controller includes a memory, and wherein the memory is configured to store a pre-set temperature.

29. The warming drawer of claim 28 wherein the memory is configured to store a pre-set warming time.

* * * * *